(12) United States Patent
Morita

(10) Patent No.: US 11,076,057 B2
(45) Date of Patent: Jul. 27, 2021

(54) IMAGE SCANNING APPARATUS WITH AN IMPROVED NOTIFICATION PROCESS USING SHRINK IMAGES

(71) Applicant: KYOCERA Document Solutions Inc., Osaka (JP)

(72) Inventor: Keiko Morita, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 16/550,752

(22) Filed: Aug. 26, 2019

(65) Prior Publication Data
US 2020/0076958 A1    Mar. 5, 2020

(30) Foreign Application Priority Data

Aug. 30, 2018    (JP) .............................. JP2018-161378

(51) Int. Cl.
*H04N 1/00* (2006.01)
*H04N 1/32* (2006.01)

(52) U.S. Cl.
CPC ..... *H04N 1/00212* (2013.01); *H04N 1/00217* (2013.01); *H04N 1/00225* (2013.01); *H04N 1/00244* (2013.01); *H04N 1/32122* (2013.01); *H04N 2201/325* (2013.01); *H04N 2201/3226* (2013.01)

(58) Field of Classification Search
CPC .......... H04N 1/00225; H04N 1/00212; H04N 2201/325; H04N 2201/3226; H04N 1/00217; H04N 1/32117; H04N 1/00114
See application file for complete search history.

(56) References Cited

U.S. PATENT DOCUMENTS

| | | | |
|---|---|---|---|
| 2002/0054373 A1 | 5/2002 | Nishiyama | |
| 2005/0195446 A1* | 9/2005 | Kasatani | H04N 1/00222 358/402 |
| 2006/0007481 A1* | 1/2006 | Kato | H04N 1/40062 358/1.15 |
| 2008/0263036 A1 | 10/2008 | Canon | |
| 2012/0047213 A1* | 2/2012 | Hanada | H04L 51/08 709/206 |
| 2012/0235960 A1* | 9/2012 | Maekawa | H04N 1/00938 345/204 |
| 2017/0200122 A1* | 7/2017 | Edson | H04L 63/104 |
| 2019/0132472 A1* | 5/2019 | Ogata | H04N 1/00095 |

FOREIGN PATENT DOCUMENTS

JP    2006-311344    11/2006

\* cited by examiner

*Primary Examiner* — Nicholas Pachol

(57) ABSTRACT

In an image scanning apparatus, an image scanning unit scans one or more page images from a document of one or more pages and generates image data of the one or more page images. An image acquiring unit acquires the image data, generates a document image file including the image data, and stores the document image file into a specific folder. A communication processing unit transmits to a specific destination a message that includes a network identifier of the document image file. A server unit transmits the document image file upon receiving a transmission request that specifies the network identifier. Further, the communication processing unit includes a shrink image of a predetermined page among the one or more page into the message; and the server unit performs image search for the shrink image as a search key upon receiving an image search request that specifies the shrink image.

3 Claims, 6 Drawing Sheets

IMAGE SCANNING APPARATUS WITH AN IMPROVED NOTIFICATION PROCESS USING SHRINK IMAGES

CROSS-REFERENCE TO RELATED APPLICATIONS

This application relates to and claims priority rights from Japanese Patent Application No. 2018-161378, filed on Aug. 30, 2018, the entire disclosures of which are hereby incorporated by reference herein.

BACKGROUND

1. Field of the Present Disclosure

The present disclosure relates to an image scanning apparatus.

2. Description of the Related Art

An image scanning apparatus stores an image file of a document image (hereinafter, called "document image file") scanned from a document into a box (folder), and transmits a message (email or the like) including a URL (Uniform Resource Locator) of the image file, and thereby provides a function that a user specifies the URL included in the message by operating a terminal apparatus or the like and downloads the image file (i.e. scan URL transmission job function).

However, after saving a document image file in a scan URL transmission job or the like, if the URL becomes improper due to moving the document image file, changing a file name of the document image file or the like, for example, then even when a user operates a terminal apparatus and thereby specifies the URL included in the message and transmits a transmission request of the document image file to the image scanning apparatus, downloading the document image file is failed because the document image file is not found at a location specified by the URL.

SUMMARY

An image scanning apparatus according to an aspect of the present disclosure includes an image scanning unit, an image acquiring unit, a communication processing unit, and a server unit. The image scanning unit is configured to scan one or more page images from a document of one or more pages and generate image data of the one or more page images. The image acquiring unit is configured to acquire the image data, generate a document image file including the image data, and store the document image file into a specific folder. The communication processing unit is configured to transmit to a specific destination a message that includes a network identifier of the document image file. The server unit is configured to transmit the document image file upon receiving a transmission request that specifies the network identifier. Further, the communication processing unit includes a shrink image of a predetermined page among the one or more page into the message; and the server unit performs image search for the shrink image as a search key upon receiving an image search request that specifies the shrink image.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
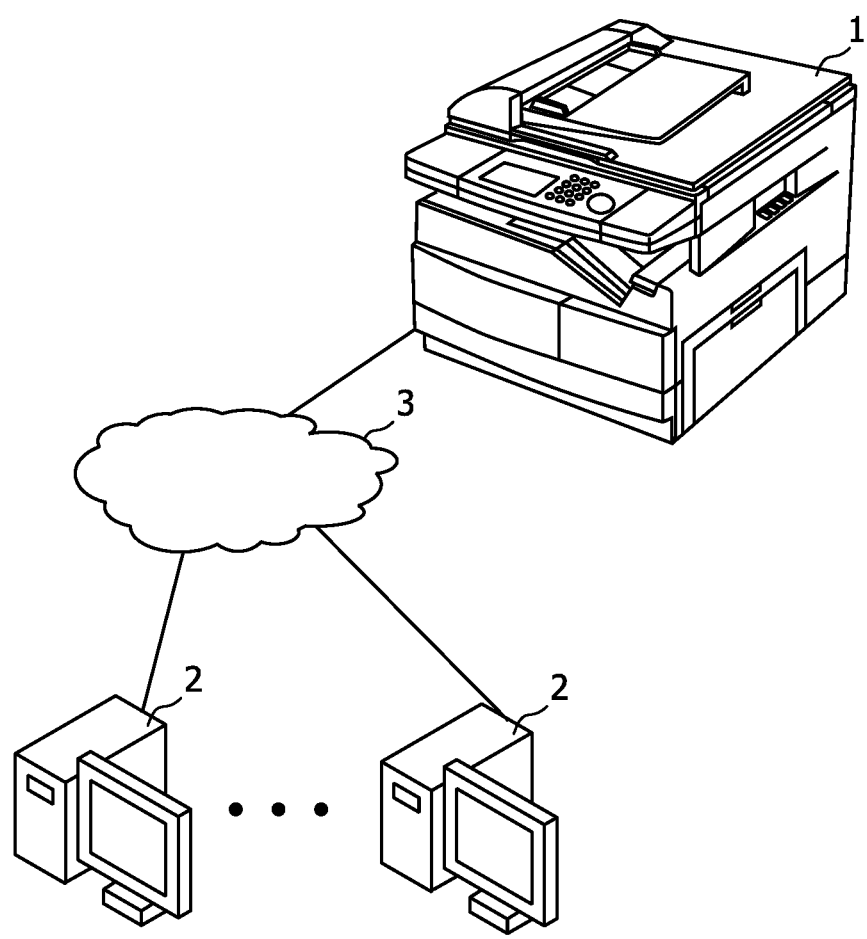
FIG. 1 shows a perspective view diagram that indicates an image scanning apparatus according to an embodiment of the present disclosure.

FIG. 1 shows a perspective view diagram that indicates an image scanning apparatus according to an embodiment of the present disclosure. In FIG. 1, the image scanning apparatus 1 is a multi function peripheral that has an image scanning function, and is a sort of an image scanning apparatus. A terminal apparatus 2 is a terminal apparatus such as personal computer operated by a user, and is capable of directly or indirectly communicating with the image scanning apparatus 1 through a network 3. For example, plural terminal apparatuses 2 respectively used by plural users are capable of communicating with the image scanning apparatus 1 through the network 3. The network 3 is Internet, a LAN (Local Area Network) or the like.

Figure 2:
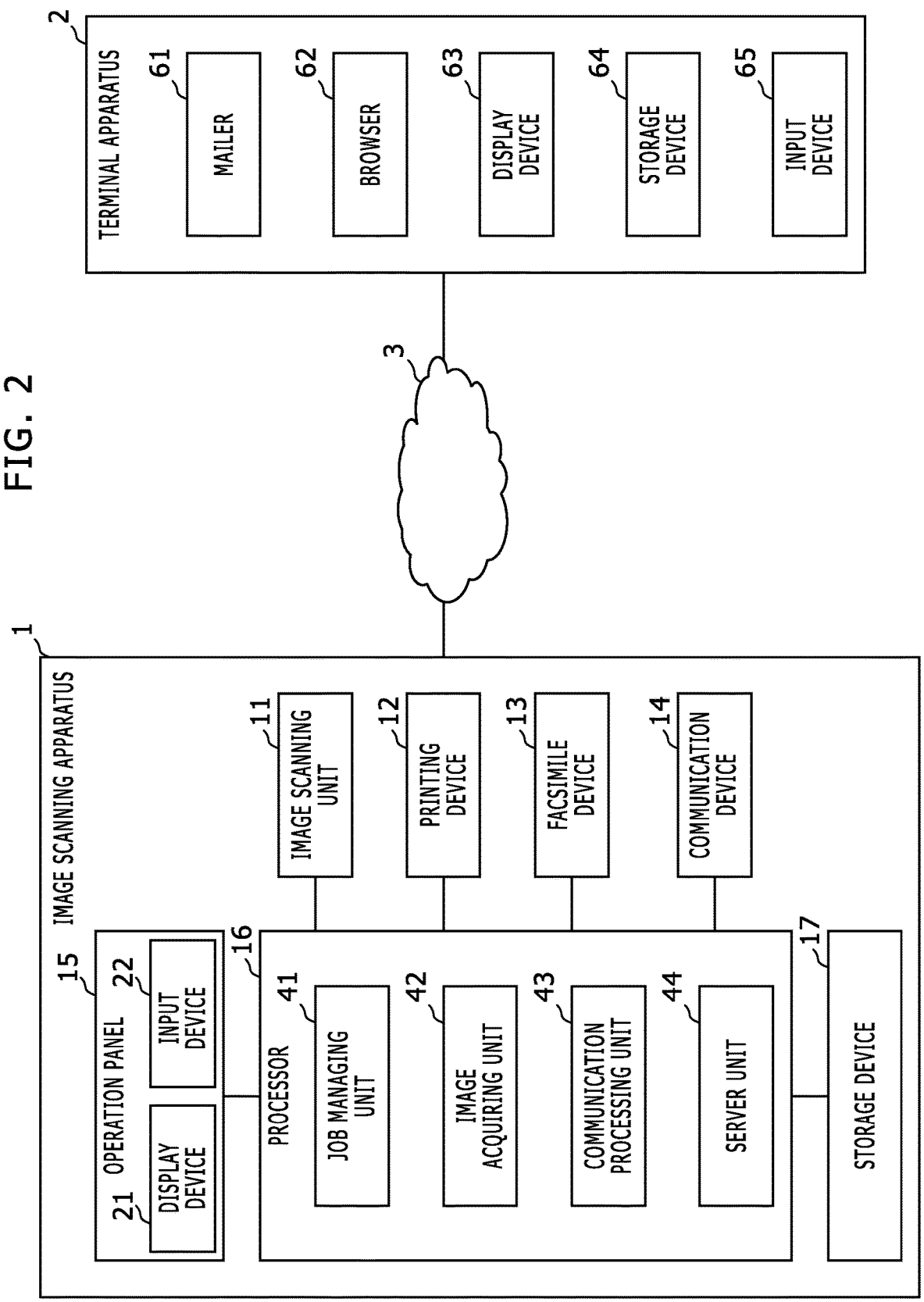
FIG. 2 shows a block diagram that indicates a configuration of the image scanning apparatus 1 shown in FIG. 1.

FIG. 2 shows a block diagram that indicates a configuration of the image scanning apparatus 1 shown in FIG. 1. The image scanning apparatus 1 shown in FIGS. 1 and 2 includes an image scanning unit 11, a printing device 12, a facsimile device 13, a communication device 14, an operation panel 15, a processor 16, a storage device 17, and the like.

The image scanning unit 11 optically scans one or more page images from a document including one or more pages put on a platen glass or fed by an automatic document feeder, and generates image data of the one or more page images.

The printing device 12 is an internal device that performs printing of an image based on the image data obtained with the scanning or the like.

The facsimile device 13 is an internal device that transmits the image data obtained with the scanning as a facsimile signal, and receives a facsimile signal and generates image data.

The communication device 14 is an internal device such as network interface that performs communication with the terminal apparatus 2 or the like through the network 3.

The operation panel 15 is arranged on an upper surface of a housing of the image scanning apparatus 1, and includes a display device 21 that displays a screen to a user and an input device 22 that receives a user operation performed by the user. The display device 21 is a liquid crystal display or the like. The input device 22 is a hard key, a touch panel that forms a soft key with the display device 21, and/or the like.

The processor 16 includes an ASIC (Application Specific Integrated Circuit), a computer and/or the like and the computer includes a CPU (Central Processing Unit), a ROM (Read Only Memory), a RAM (Random Access Memory), and the like, and the processor 16 acts as processing units using the ASIC, the computer and/or the like. Specifically, the processor 16 loads a program stored in the ROM or a storage device (not shown) to the RAM, and executes the program with the CPU and thereby acts as processing units, namely by means of software, and/or acts as processing units using the ASIC and the like, namely by means of hardware.

The processor 16 acts as a job managing unit 41, an image acquiring unit 42, a communication processing unit 43, and a server unit 44.

The job managing unit 41 performs a job such as scan URL transmission job using the internal devices when receiving a job request of the job. If the job is a scan URL transmission job, the job managing unit 41 performs the job using the image scanning unit 11, the image acquiring unit 42, and the communication processing unit 43.

The image acquiring unit 42 acquires the image data generated by the image scanning unit 11, generates a document image file including the image data, and saves the document image file into a specific folder. This specific folder is allocated in a non-volatile storage device (flash memory, hard disk drive or the like) such as the internal storage device 17 or an external storage device (not shown).

For example, when a document image file is generated of a document including plural pages in one job in accordance with job setting in a job request, generated and saved is one document image file including page images of the plural pages (e.g. PDF file).

The communication processing unit 43 transmits a message to a specific destination using the communication device 14, and the message includes a network identifier of the document image file saved in the specific folder. This message is transmitted in accordance with a predetermined protocol. In this embodiment, the network identifier is a URL, and this message is transmitted as an email.

Thus, in a scan URL transmission job, the aforementioned document image file is saved in a specific folder, and a message that includes a URL of the document image file is transmitted.

Further, this "specific destination" is a destination (e.g. email address or the like) specified by a user operation, a user setting, a job setting or the like.

This URL may be (a) a URL that directly indicates the document image file, or (b) a URL that indicates a CGI (Common Gate Interface) and in which a parameter indicates the document image file.

Further, the server unit 44 receives a transmission request that specifies the aforementioned network identifier (e.g. URL) using the communication device 14, and upon receiving the transmission request, determines and reads a document image file corresponding to the network identifier, and transmits the document image file as a response of the request to the requester. In accordance with a user operation, the terminal apparatus 2 acquires the aforementioned message (e.g. email) from a mail server using a mailer 61 or the like, displays the message on a display device 63 such as a liquid crystal display and saves the message in a storage device 64 such as RAM or flash memory, and transmits a transmission request that specifies a network identifier described in the aforementioned message using a browser 62 as a web browser or the like. In the terminal apparatus 2 a built-in computer executes a program and thereby the built-in computer acts as the mailer 61 and the browser 62.

For example, the server unit 44 is a web server, receives a request that specifies a URL in accordance with HTTP (Hypertext Transfer Protocol), and upon receiving the request, reads and transmits as a response of the request a document image file specified by the URL.

Further, the communication processing unit 43 includes a shrink image of a predetermined page among the one or more page with the aforementioned network identifier into the aforementioned message, and the server unit 44 performs image search for the shrink image as a search key upon receiving an image search request that specifies the shrink image. In this embodiment, the shrink image is a thumbnail image.

If the shrink image is included in the message, and the message is an email, then (a) the shrink image is embedded in a main text of an HTML (Hypertext Markup Language) mail as the email, (b) an image file of the shrink image is attached as an attachment file to a text mail as the email, or the like.

For example, the image acquiring unit 42 selects a predetermined page among the aforementioned one or more pages and shrinks a page image of the selected page, and thereby generates the aforementioned shrink image.

The aforementioned "predetermined page" is the first page, a page specified by a user, a page automatically selected in accordance with a specific characteristic amount or the like. For example, the predetermined page is selected from the aforementioned one or more pages in accordance with a specific characteristic amount (for example, whether a color image is included or not and color distribution, whether a character is included or not and a size of the character, whether a table or chart is included or not and a size of the table or chart, or the like) of each page image of the one or more pages.

For example, the page image of which a total of the characteristic amount gets largest is selected; and the characteristic amount is calculated as follows. If a color image is included in a page image then the characteristic amount of the page image gets large and if a color distribution of a page image is wide then the characteristic amount of the page image gets large. If a character is included in a page image then the characteristic amount of the page image gets large and if a size of the character is large then the characteristic amount of the page image gets large. If a table or chart is included in a page image then the characteristic amount of the page image gets large and if a size of the table or chart is large then the characteristic amount of the page image gets large.

For example, for an image comparing method used in the image search of the server unit 44, a page is selected as the aforementioned "predetermined page" such that the characteristic amount of the page causes a page image of the page to be easily hit in the image search (i.e. causes a page image of another page not to be easily hit in the image search).

In this embodiment, the communication processing unit 43 (a) includes the aforementioned shrink image with the aforementioned network identifier into the message if a predetermined condition is satisfied, and (b) does not include the aforementioned shrink image with the aforementioned network identifier into the message if a predetermined condition is not satisfied.

This "predetermined condition" is, for example, (a) that a file name of the document image file is not specified by a user, (b) that a predetermined time (e.g. one day or one week) does not elapse from a time that the specific folder was created, (c) that attachment of the shrink image is specified by a user operation or user setting, or the like.

Further, in this embodiment, the image acquiring unit 42 (a) stores the aforementioned document image file into a predetermined storage device (the storage device 17 or the like), (b1) stores an image file of the shrink image for the image search (i.e. search-oriented shrink image) so as to associate the image file with the document image file if the communication processing unit included the shrink image into the message and (b2) does not store an image file of the shrink image for the image search so as to associate the image file with the document image file if the communication processing unit did not include the shrink image into the message. The server unit 44 performs the image search of the shrink image for the image search (i.e. search-oriented shrink image) for finding the shrink image as a search key specified by the image search request.

Further, in this embodiment, for all the document image files of the acquired page images, the image acquiring unit 42 stores a display-oriented shrink image of each document image file so as to associate the display-oriented shrink image with the document image file. The display-oriented shrink image is obtained by shrinking any page image in each document image file. Therefore, the display-oriented shrink images are generated for all the document image files and associated with all the document image files, but the search-oriented shrink images are generated for a part of the document image files and associated with the part of the document image files.

The display-oriented shrink image is used in a list of the document image files saved in the specific folder, and the list is displayed on the display device 21 of the operation panel 15 or the display device 63 of the terminal apparatus 2 in accordance with a user operation.

Figure 3:
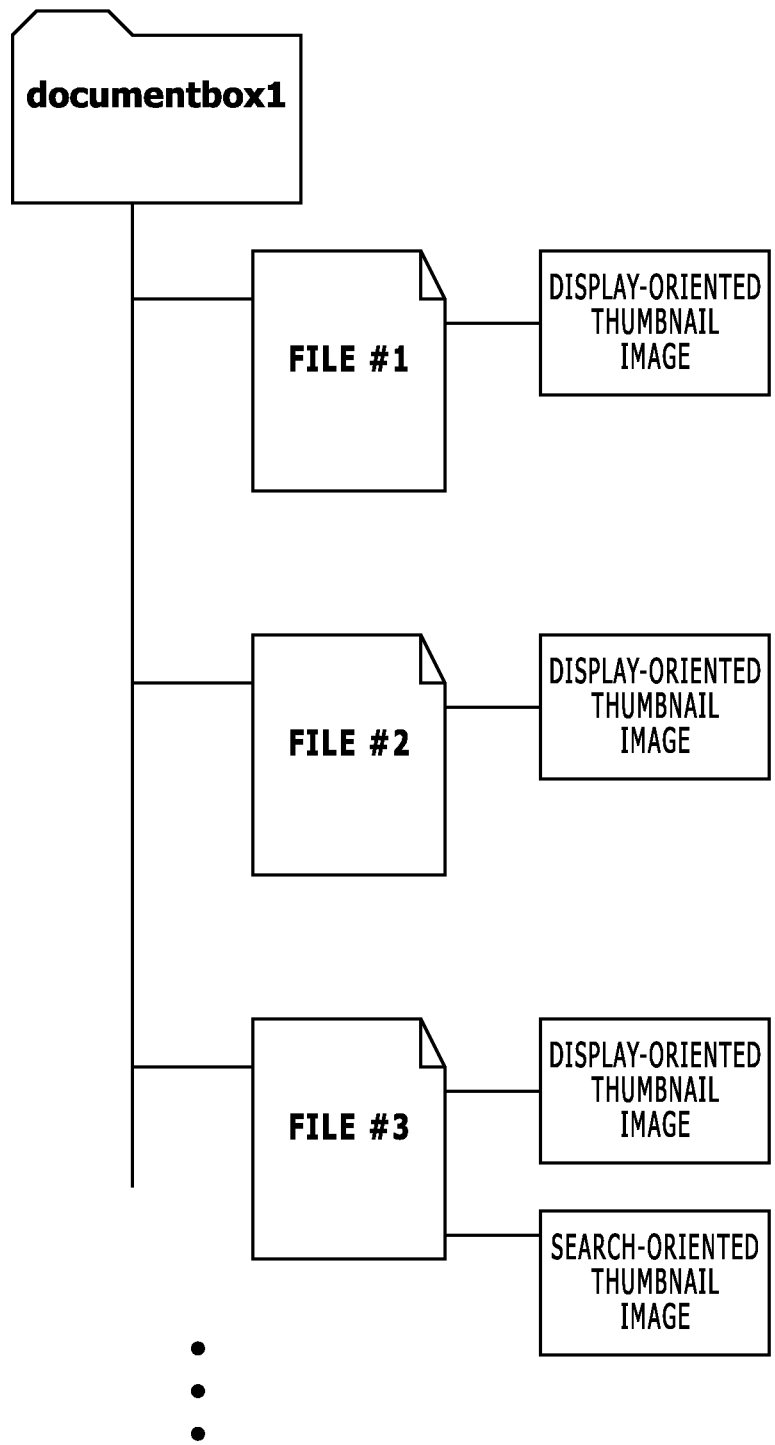
FIG. 3 shows a diagram that explains a relationship among a document file, a display-oriented thumbnail image as a display-oriented shrink image and a search-oriented thumbnail image as a search-oriented shrink image saved in a specific folder by the image scanning apparatus 1 shown in FIGS. 1 and 2.

FIG. 3 shows a diagram that explains a relationship among a document file, a display-oriented thumbnail image as a display-oriented shrink image and a search-oriented thumbnail image as a search-oriented shrink image saved in a specific folder by the image scanning apparatus 1 shown in FIGS. 1 and 2.

For example, as shown in FIG. 3, three document image files (FILE #1, FILE #2, and FILE #3) corresponding to three documents are saved in the folder "document box1" as the specific folder, and display-oriented thumbnail images are associated with all the files (FILE #1, #2, #3) respectively; and a search-oriented thumbnail image is associated with FILE #i for which the search-oriented thumbnail image was transmitted, and a search-oriented thumbnail image is not associated with FILE #i for which the search-oriented thumbnail image was not transmitted.

Figure 4:
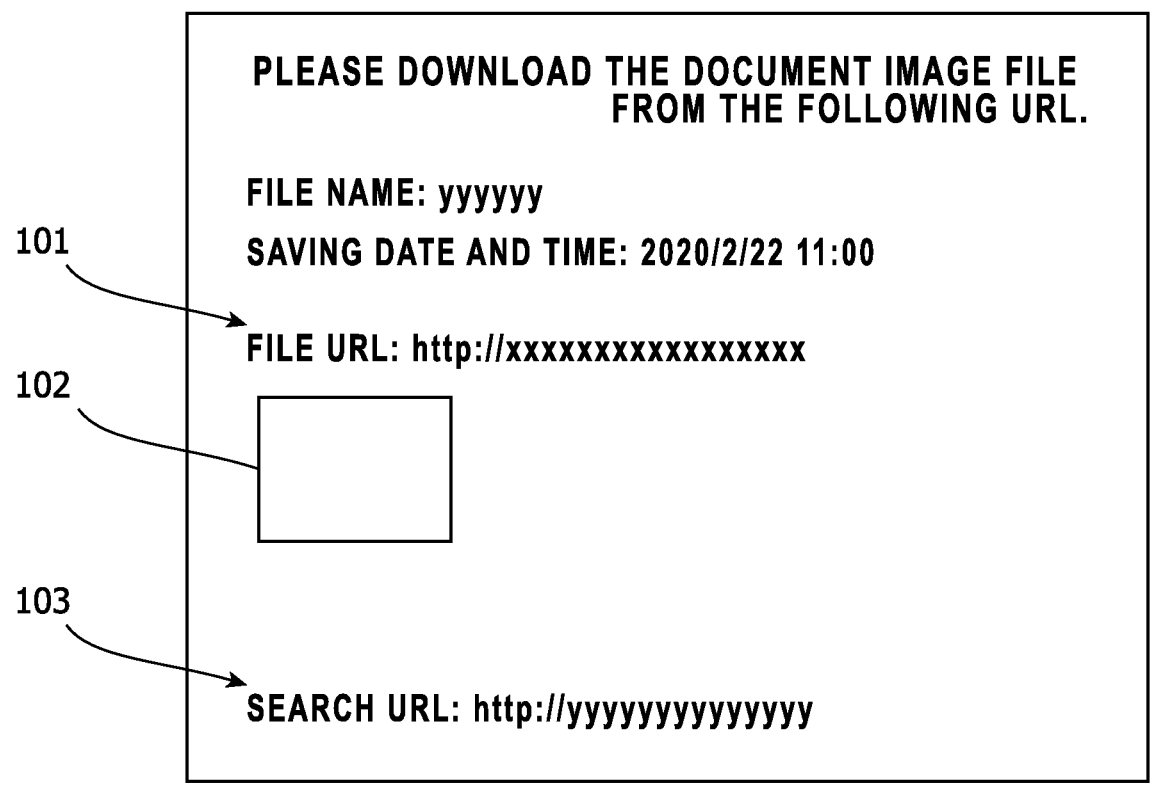
FIG. 4 shows a diagram that indicates an example of an email as a message transmitted from the image scanning apparatus 1 shown in FIGS. 1 and 2.

FIG. 4 shows a diagram that indicates an example of an email as a message transmitted from the image scanning apparatus 1 shown in FIGS. 1 and 2. In the terminal apparatus 2, the message is displayed on the display device 63 by the mailer 61. For example, as shown in FIG. 4, the message includes a file name of the saved document image file, saving date and time of the saved document image file, a link 101 including a file URL of the saved document image file, a thumbnail image 102 as the shrink image, and a link 103 including a search URL for the image search.

The search URL is a URL of a web page for the image search, and if a user operates the input device 65 such as touch panel or mouse and thereby presses down the link 103, then the browser 62 of the terminal apparatus 2 transmits a transmission request of search screen data to the search URL. The server unit 44 receives the transmission request of search screen data using the communication device 14, and transmits the search screen data described in HTML as a response to the transmission request. Upon receiving the search screen data, the browser 62 of the terminal apparatus 2 displays a search screen based on the search screen data on the display device 63.

Figure 5:
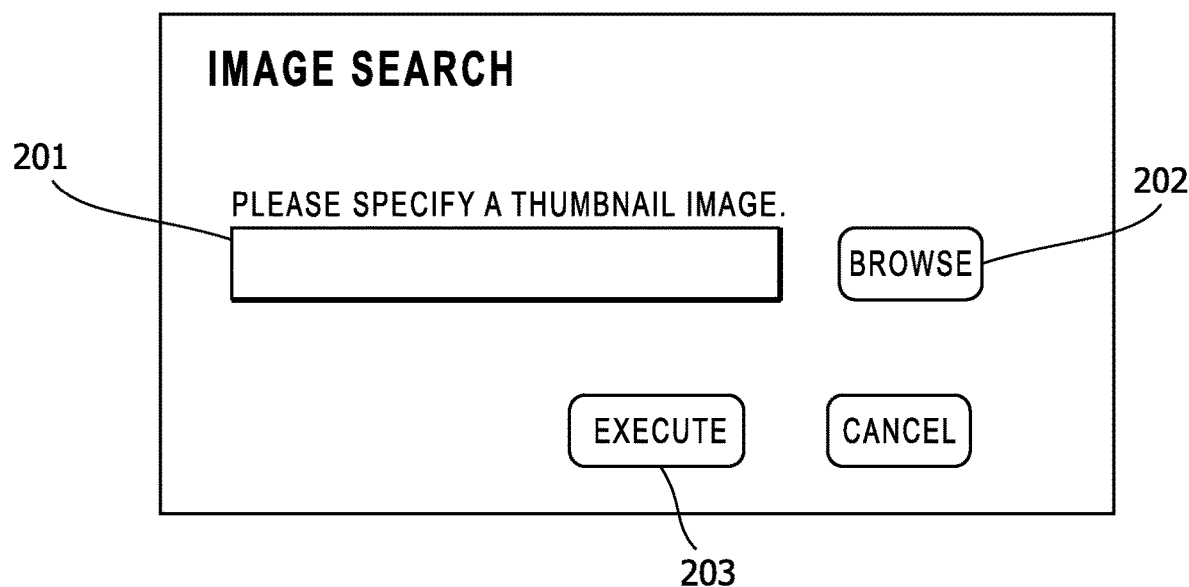
FIG. 5 shows a diagram that indicates an example of a search screen specified by a search-oriented URL in the message shown in FIG. 4.

FIG. 5 shows a diagram that indicates an example of a search screen specified by a search-oriented URL in the message shown in FIG. 4. For example, as shown in FIG. 5, the search screen includes an input field 201 for inputting a local filepath of an image file of the thumbnail image 102 (i.e. shrink image) stored in the terminal apparatus 2, a browse key 202 for specifying an image file of the thumbnail image 102 (i.e. shrink image) using a filer included an operating system of the terminal apparatus 2, an execute key 203 and the like. The browse key 202 and the execute key 203 are soft keys.

The user performs a user operation to the input field 201 or the browse key 202 and thereby specifies an image file of the thumbnail image 102 (shrink image) included in a received email as the aforementioned message, and presses down the execute key 203. Upon pressing down the execute key 203, the browser 62 transmits an image search request with the specified image file of the thumbnail image 102 (shrink image) to the server unit 44.

Upon receiving the image search request from the terminal apparatus 2, the server unit 44 performs the image search for the thumbnail image 102 (shrink image) of the image file as a search key, and transmits as a response to the image search request a document image file with which a thumbnail image (shrink image) is detected in the image search is associated. In the terminal apparatus 2, the browser 62 receives the document image file and stores the received document image file into the storage device 64. The image search detects a shrink image that is identical or similar to the thumbnail image 102 (shrink image) as a search key. In this process, the aforementioned display-oriented thumbnail image is not searched. It should be noted that the image search uses a known image comparing method to detect an image that is identical or similar to the image as a search key.

Figure 6:
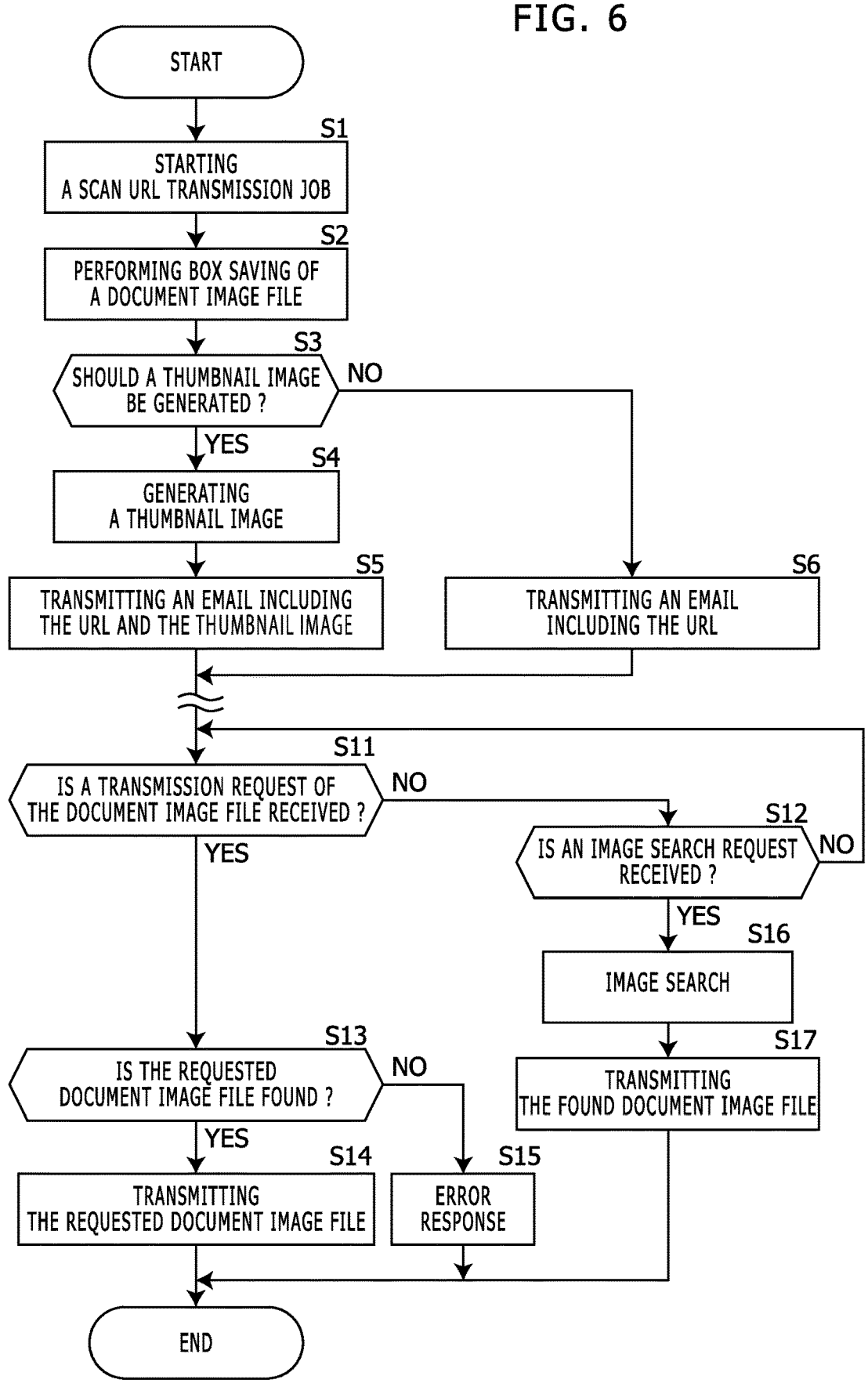
FIG. 6 shows a flowchart that explains a behavior of the image scanning apparatus 1 shown in FIGS. 1 and 2.

The following part explains a behavior of the aforementioned image scanning apparatus. FIG. 6 shows a flowchart that explains a behavior of the image scanning apparatus 1 shown in FIGS. 1 and 2.

When the job managing unit 41 receives a request of a scan URL transmission job, the job managing unit 41 causes the image acquiring unit 42 and the communication processing unit 43 to perform the scan URL transmission job (in Step S1). Consequently, here, a document image file including a page image of a document is stored in a specific folder (in Step S2).

Subsequently, the image acquiring unit 42 determines whether a thumbnail image of a predetermined page in the document should be generated in the aforementioned manner or not (in Step S3); if it is determined that the thumbnail image should be generated, then the image acquiring unit 42 shrinks a page image of the predetermined page by a predetermined shrinking ratio and thereby generates the thumbnail image, and stores the thumbnail image as a search-oriented thumbnail image into a predetermined storage device so as to associate the thumbnail image with the document image file (in Step S4), and otherwise if not, does not generate the thumbnail image.

If the thumbnail image is generated, the communication processing unit 43 generates an email including a URL of the aforementioned document image file and the generated thumbnail image, and transmits the email to a specified destination (user) using the communication device 14 (in Step S5).

Contrarily, if the thumbnail image is not generated, the communication processing unit 43 generates an email including a URL of the aforementioned document image file but not including the generated thumbnail image, and transmits the email to a specified destination (user) using the communication device 14 (in Step S6).

The user operates the terminal apparatus 2 and thereby downloads the email from a mail server (not shown) to this terminal apparatus 2. In this process, the mailer 61 downloads the email and displays the message, for example, as shown in FIG. 4 on the display device 63. The user presses down the link 101 in the email and thereby causes to transmit a transmission request of the document image file or presses down the link 103 in the email and thereby causes to transmit an image search request.

After the transmission of the aforementioned email, the server unit 44 watches whether a transmission request of the document image file is received from the terminal apparatus or not (in Step S11) and whether an image search request is received from the terminal apparatus or not (in Step S12).

If the server unit 44 receives a transmission request of the document image file from the terminal apparatus 2, then the server unit 44 determines whether the document image file is found at a location specified by the URL in the transmission request or not (in Step S13); and if the document image file is found, then the server unit 44 reads the document image file and transmits the document image file to the terminal apparatus 2 (in Step S14). Contrarily, if the document image file is not found, then the server unit 44 transmits an error notification to the terminal apparatus 2 (in Step S15). In the terminal apparatus 2, if the document image file is transmitted to and received by this terminal apparatus 2, then the browser 62 stores the document image file into the storage device 64, and if the error notification is transmitted to and received by this terminal apparatus 2, then the browser 62 displays the error notification on the display device 63.

For example, if the error notification is received, the user understands that the document image file has been moved and then requests the image search.

Upon receiving an image search request from the terminal apparatus 2, the server unit 44 performs the image search of the search-oriented thumbnail image for the thumbnail image as a search key received with the image search request (in Step S16), reads a document image file with which a thumbnail image hit in the image search is associated, and transmits the read document image file to the terminal apparatus 2 (in Step S17). In the terminal apparatus 2, the browser 62 stores the document image file into the storage device 64.

As mentioned, in the aforementioned embodiment, the image scanning unit 11 scans one or more page images from a document of one or more pages and generates image data of the one or more page images. The image acquiring unit 42 acquires the image data, generates a document image file including the image data, and stores the document image file into a specific folder. The communication processing unit 43 transmits to a specific destination a message that includes a network identifier of the document image file. The server unit 44 transmits the document image file upon receiving a transmission request that specifies the network identifier. Further, the communication processing unit 43 includes a shrink image of a predetermined page among the one or more page with the aforementioned network identifier into the aforementioned message, and the server unit 44 performs image search for the shrink image as a search key upon receiving an image search request that specifies the shrink image.

Consequently, even if a network identifier of a document image file saved in image scanning (for example, an URL transmitted in a scan URL transmission job) became improper after notifying it to a user, the user can download the document image file.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image scanning apparatus, comprising:
   an image scanning unit configured to scan one or more page images from a document of one or more pages and generate image data of the one or more page images;
   an image acquiring unit configured to acquire the image data, generate a document image file including the image data, and store the document image file into a specific folder;
   a communication processing unit configured to transmit to a specific destination a message that includes a network identifier of the document image file; and
   a server unit configured to transmit the document image file upon receiving a transmission request that specifies the network identifier;
   wherein the communication processing unit includes a shrink image of a predetermined page among the one or more page into the message;
   wherein the communication processing unit (a) includes the shrink image with the network identifier into the message if a predetermined condition is satisfied, and (b) does not include the shrink image with the network identifier into the message if a predetermined condition is not satisfied;
   wherein the predetermined condition is that a predetermined time does not elapse from a time that the specific folder was created; and
   the server unit performs image search for the shrink image as a search key upon receiving an image search request that specifies the shrink image.

2. The image scanning apparatus according to claim 1, wherein the image acquiring unit (a) stores the document image file into a predetermined storage device, (b1) stores an image file of the shrink image for the image search so as to associate the image file with the document image file if the communication processing unit included the shrink image into the message and (b2) does not store an image file of the shrink image for the image search so as to associate the image file with the document image file if the communication processing unit did not include the shrink image into the message; and
   the server unit performs the image search of the shrink image for the image search, the image search performed for the shrink image as a search key specified by the image search request.

3. The image scanning apparatus according to claim 1, wherein the image acquiring unit shrinks a page image of a predetermined page among the one or more page images and thereby generates the shrink image; and
   the predetermined page is selected from the one or more pages in accordance with a specific characteristic amount of each page image of the one or more pages.

* * * * *